Oct. 30, 1956   F. F. LEWIS   2,768,896
STORAGE OF AGRICULTURAL PRODUCTS
Filed Feb. 19, 1954
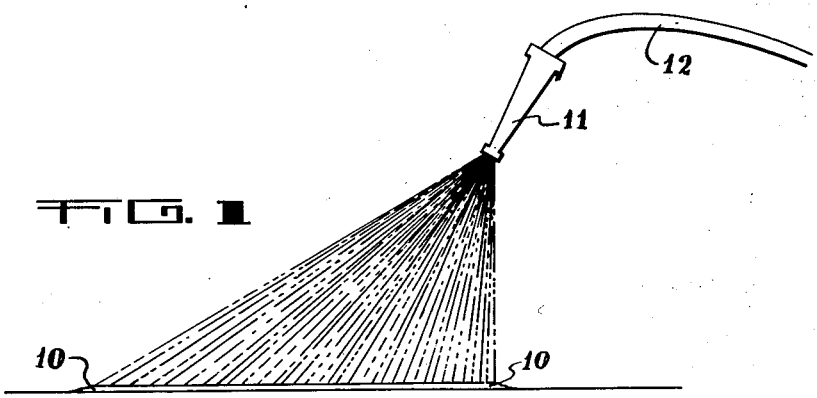
FIG. 1
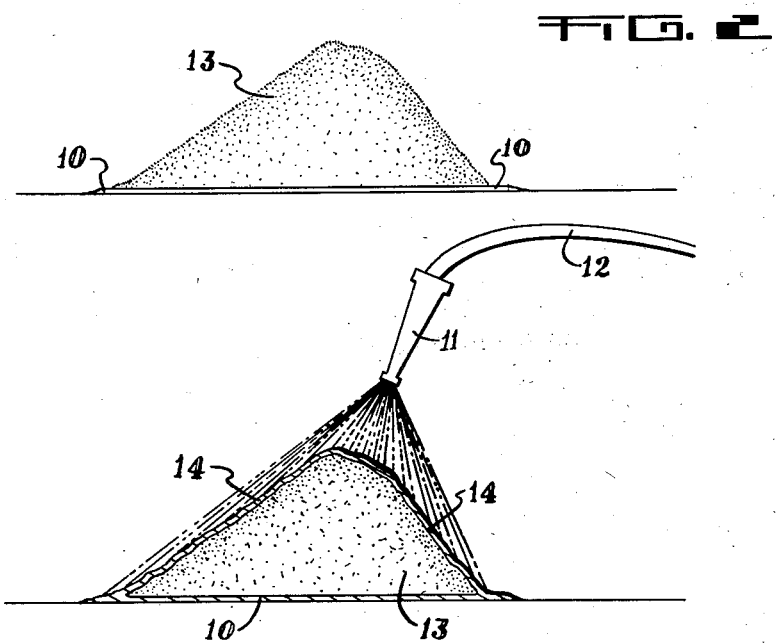
FIG. 2
FIG. 3
INVENTOR.
FRED F. LEWIS
BY Robert C. Comstock
ATTORNEY

United States Patent Office 2,768,896
Patented Oct. 30, 1956

2,768,896

STORAGE OF AGRICULTURAL PRODUCTS

Fred F. Lewis, Brady, Mont.

Application February 19, 1954, Serial No. 411,428

1 Claim. (Cl. 99—2)

The present invention relates to a new and improved method for storing agricultural crops and to constructions utilized for this purpose.

It is well known that tremendous quantities of agricultural products such as wheat, oats, hay, straw and other human and animal foods must be stored both temporarily and for extended periods of time in stacks which are placed upon the ground in the open air, without protection of any kind from spoilage and losses due to rotting, winds, vermin and other destructive forces. This type of storage must be resorted to because there are inadequate storage and transportation facilities available to handle the crops of agricultural products as they are harvested or because the market cannot absorb the products as rapidly as they become available. Losses amounting to many millions of dollars annually necessarily result from the destruction of such agricultural products through bacterial and fungal action, wind and weather action and animal depredations.

It is a broad object of my invention to provide a new method for storing agricultural crops which is simple and economical to use and which will save millions of dollars' worth of food products which are now lost. A further object is to provide a method which is extremely effective for storing various materials of the class described for either short or long periods, and which is specifically designed to supplant the present procedures of placing crops for which adequate storage is unavailable directly upon the ground, and to overcome the defects of this latter procedure. A still further object of the instant invention is to create simple constructions of an unusual type which are both simple and inexpensive to manufacture and which are extremely effective for the purpose intended.

It may be briefly stated that the method of the present invention comprises the steps of forming a water impervious surface upon the ground or other substrata, placing the material to be stored upon such surface, and covering the so-stored material with a protective coating, this coating being joined with the surface around the edge of the material being stored. Both the surface and the coating employed as indicated are created of one or more suitable materials as will be more fully described. A composite structure resulting from this series of steps may be termed a construction of the invention.

My invention is particularly adapted to be used for the protection of agricultural products which are in the form of loose kernels such as harvested wheat, oats, and the like.

My invention also comprises such other objects, advantages and capabilities as will later more fully appear and which are inherently possessed by my invention.

While I have shown in the accompanying drawing and described herein preferred embodiments of my invention, it should be understood that the same are susceptible of modification and change without departing from the spirit of my invention.

Referring to the drawings,

Fig. 1 is a side perspective view, showing the creation of a protective surface upon the ground;

Fig. 2 is a side perspective view showing a stack of agricultural products in place upon the protective surface;

Fig. 3 is a side perspective view, showing the creation of a protective layer or coating which adheres to the outer surfaces of the stack of agricultural products.

The various elements shown in the drawings are not drawn to scale, but are enlarged or reduced for purposes of effective illustration.

Referring to Fig. 1 of the drawings, a preferred embodiment which has been selected to illustrate my invention comprises applying a protective surface 10 on the ground or base upon which the stack of agricultural products is to be placed. Such surface 10 is preferably created by spraying a suitable material of the type hereinafter described upon the ground by means of a sprayer 11, which is connected to a hose 12. The material sprayed is preferably in liquid form when applied to the ground and dries to form a protective surface 10, which adheres to the surface of the ground.

When this has been completed, a stack 13 of grain or other agricultural products is placed upon surface 10, as shown in Fig. 2 of the drawings. The top and sides, including all exposed surfaces of stack 13 are then sprayed in the manner previously described with a suitable material in liquid form. The material dries to form an outer protective layer 14 which adheres to the agricultural product around the outer surfaces of stack 13, as shown in Fig. 3 of the drawings.

A number of various materials may be employed in creating the surface 10 and the coating 14 described above. Any materials may be used for the surface 10 which are highly water resistant, of such a character that they do not impart toxic qualities to grain or related material in contact with them and do not affect the taste of such materials, which are preferably highly resistant to weathering and which may be applied and used in the manner herein described. Materials which are suitable for this purpose include resins such as styrene, styrene derivatives, various known non-uniform copolymers and interpolymers of styrene and other monomers, polyester-styrene resins such as, for example, are created by the copolymerization of styrene with a maleic anhydride-ethylene glycol unsaturated alkyd of a molecular weight of about 1500 using a peroxide catalyst such as benzoyl peroxide.

Other related compounds which may be used for this purpose include the copolymerization products of related unsaturated alkyds of difunctional glycols such as ethylene glycol and acids such as fumaric or maleic acids and various other vinyls such as divinyl benzene, diallyl phthalate, or the like. Polyvinyl acetate, polyvinyl chloride, polyacrylic and polymethacrylic acids, polyisobutylene, and related compounds can also be employed, although with certain of such compounds it may be necessary to utilize a surface coating of wax or the like in order to impart water impenetrability.

The preferred embodiment of my invention is polyethylene, either alone or containing 5 to 10% polyisobutylene. This material is easily handled, is non-toxic, is comparatively very stable against weathering, and is sufficiently flexible to withstand minor shocks and abrasions after it has been placed into a surface. It is to be understood that any of the materials indicated herein may be stabilized against weathering in any conventional means known to the art, and, further that the above listing is far from being inclusive in that other materials having similar properties can be employed.

The precise means by which protective surface 10 on the ground or other substrata will be erected will vary, depending upon the material selected for this surface. Various polyesters or monomers, such as, for example, styrene, can be cast or sprayed with a catalyst directly upon the ground in sufficient depth to possess reasonable strength and to be water-resistant, using various edge supports if desired, and can be polymerized in situ either by the action of such catalysts alone or in conjunction with ultraviolet rays from the sun. Thermoplastic aliphatic vinyl compounds such as are indicated above can be sprayed directly upon the ground from a polymer melt to a thickness as indicated above. This type of procedure is preferred for its simplicity and because it is normally employed in coating crops stored as indicated above. It is also possible to spray solvent solutions of resins such as the vinyls indicated above, but this is not normally desired both because of the costs involved and because of the danger of contamination from residual or unevaporated solvent.

After a surface 10 as indicated above has been created, a stack 13 of agricultural products of the class described is placed upon surface 10 and covered with a substantially water-impervious protective covering 14 which is joined to the edges of surface 10 around stack 13 so as to seal stack 13 against moisture. The actual junction required will frequently not be a seal in which the two resins are completely "welded" together or otherwise bonded, but merely be the two resins having their surfaces fitting intimately against one another so as to be comparatively impervious to water. For convenience, it is preferable to have both coating 14 and surface 10 to be of the same composition. Further, when this is the case a very effective moisture seal between the coating 14 and surface 10 results if the coating is applied at a high enough temperature to cause fusion between these two layers.

The materials which may be employed for coating 14 are more limited in number than those which can be used in forming surface 10 as previously indicated. The materials used for this purpose must be capable of being sprayed from a melt directly upon various crops so as to form a water-impervious coating. Broadly any of the thermomelting vinyl compounds previously indicated can be used for this purpose, although as a practical matter because of high melting points, cost, etc., the majority of such compounds are not generally employed. The preferred material for use in forming coating 14 is polyethylene of a molecular weight of from about 8,000 to about 14,000 for the reasons indicated above and because it may be easily melted at slightly elevated temperatures and sprayed. Further, such polyethylene coatings are inherently comparatively stable to weathering, and can be made even more stable by being mixed with up to 2% by weight of stabilizers such as phenyl-naphthylamine or hydroquinone. Particularly suitable polyethylene for outdoor use contains from 1 to 5% of finely divided carbon black as a stabilizer. If it is contemplated that particularly thick sections of polyethylene are to be used in a coating the intermixture of from 5 to 10% of polyisobutylene with this material is particularly advantageous in preventing any danger of cracking.

It will be realized that my constructions are not self-supporting, but rely upon the support of the earth or other substrata and of the product being stored. Inasmuch as stack 13 may shift after being covered with protective coating 14 because of snow loads, wind storms, etc., it is extremely advantageous that coating 14 be composed of a flexible resin such as polyethylene as indicated above. Coatings of this and other resins of the invention merely act at their inner surface essentially as a binder for the top layer of stack 13. Hence, it is advisable that such coatings be flexible enough to conform to movement of the product.

In order to furnish ventilation, I may provide a plurality of ducts or air vents which extend through stack 13. These are desirable to prevent spoilage from occurring within stack 13. I may also use as an alternative or in addition thereto a suitable desiccant such as silicagel or the like to absorb moisture from within stack 13.

My invention may also be used in connection with agricultural products which are stored in temporary or semi-exposed housings such as cribs or the like, with the surface 10 and protective coating 14 covering all exposed surfaces of the agricultural products and protecting them from loss, damage or destruction.

Those skilled in the art will realize that the present invention is capable of wide modification within the scope of this disclosure without departing from the essential teachings herein set forth.

My invention may also be used for the protection of baled and loose hay. The method described herein may also be used to provide cooperage for grain cars, particularly where the floor and sides of the car are joined together and on the ends of the car.

It should be noted that my invention also protects the agricultural products from impurities such as small animal and bird droppings which often contaminate agricultural products which are stored in the open air. My invention provides protection from such impurities and from all other impurities which cannot penetrate the protective layer which is formed around the agricultural products.

I claim:

A method of protecting and storing exposed agricultural products having the form of loose kernels which comprises forming a non-toxic water impervious surface upon the ground by spraying thereon a non-toxic thermoplastic flexible resin which dries to form a continuous protective surface across the ground, placing a stack of loose kernels of agricultural products to be stored and protected upon said protective surface, and then spraying upon and around the entire exposed outer surface of said stack of loose agricultural products a non-toxic thermoplastic flexible resin which adheres to the kernels which are disposed adjacent the outer surfaces of said stack and which adheres to said protective surface to form a substantially water impervious junction with said protective surface around the entire circumference of the stack to protect said agricultural products from deterioration due to weather, rotting, depredation and other destructive forces.

References Cited in the file of this patent

UNITED STATES PATENTS

| 1,551,427 | Pfister | Aug. 25, 1925 |
| 2,593,577 | Lewis | Apr. 22, 1952 |

FOREIGN PATENTS

| 468,940 | Great Britain | 1937 |